W. H. NOELTING.
BALL BEARING CASTER.
APPLICATION FILED JAN. 27, 1922.
1,424,028.
Patented July 25, 1922.
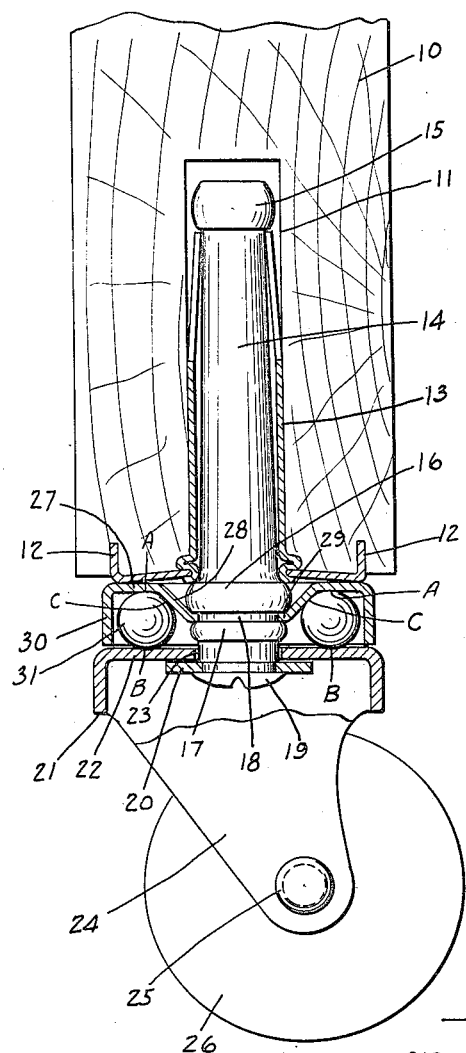
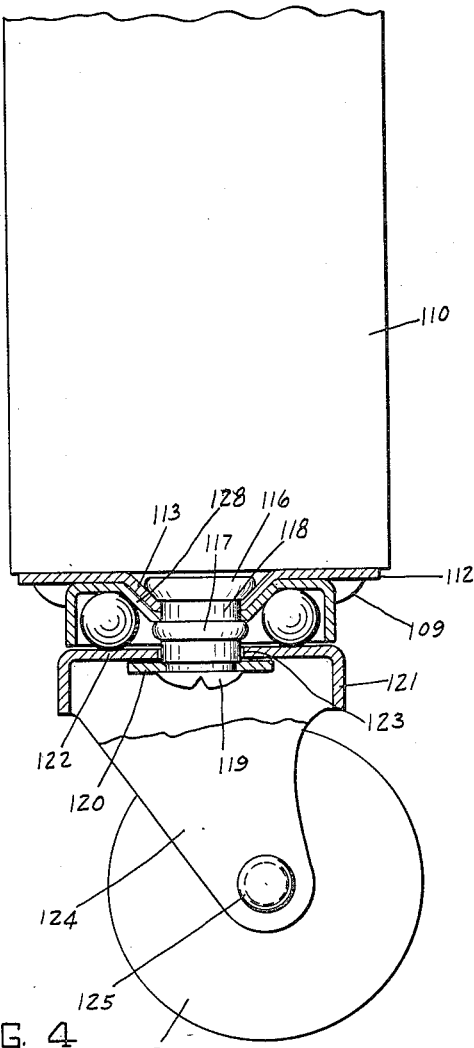
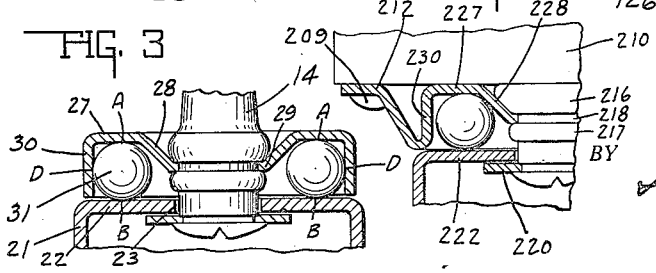
INVENTOR.
WILLIAM H. NOELTING.
BY
ATTORNEYS.

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

BALL-BEARING CASTER.

1,424,028.  Specification of Letters Patent.  Patented July 25, 1922.

Application filed January 27, 1922. Serial No. 532,165.

*To all whom it may concern:*

Be it known that I, WILLIAM H. NOELTING, a citizen of the United States, and a resident of Evansville, county of Vanderburg, and State of Indiana, have invented a certain new and useful Ball-Bearing Caster; and I do hereby declare that the following is a full, clear, and exact description thereof, reference being had to the accompanying drawings, in which like numerals refer to like parts.

This invention relates to a ball bearing caster construction and to improvements therein by which the friction of the moving parts is reduced to a minimum, and the direction of the stresses is directed both laterally and vertically.

The chief feature of the invention consists in providing a unitary cup which is adapted to be associated with a trackplate. Said cup is distinguished by an inner and outer wall, the inner wall being inclined at an angle of 45 degrees, and the outer wall being extended to form a guard flange or apron. The ball channel or race provided by said inner and outer walls is of greater width than the diameter of said balls.

Another feature of the invention, which is a result of the construction described, consists in a three point bearing for each ball, two of which always consist of the top and bottom walls of the ball raceway when the caster is in load-supporting position.

A further feature of the invention resides in the dual plate and cup association.

The full nature of the invention will be understood from the accompanying drawings and the following description and claims.

In the drawings, Fig. 1 is a central sectional view of a furniture leg, a caster socket and the ball bearing caster associated therewith, parts being shown in elevation. Fig. 2 is an elevational view of a furniture leg and a plate caster construction showing in section the invention therein. Fig. 3 is a sectional view of a portion of the parts illustrated in Fig. 1 and shows said parts in a second position. Fig. 4 is a sectional view of a portion of a modified form of plate caster construction.

In the drawings 10 indicates a furniture leg having a caster socket recess 11. Said leg is adapted to receive a gripping plate 12 which supports a yielding retainer socket 13 within said socket recess 11.

The caster comprises the usual supporting swivel member which in Figs. 1 and 3 is shown in the form of a stem or pintle 14 having an enlarged head 15 to prevent the escape of said stem by said head engaging the yielding socket retainer 13. The pivot member includes an enlarged portion in the form of a collar or shoulder 16, which may be formed by upsetting the pivot member; and adjacent said shoulder or collar 16 is a second shoulder or collar 17. Between said shoulders or collars, there is an annular groove or channel 18. The pivot is extended and the free end thereof is enlarged at 19 to retain a caster yoke and wheel upon said pivot. Herein a retaining washer 20 assists the enlarged or upset end 19 of the pivot to retain the caster yoke 21 having the track plate portion 22 which is centrally apertured at 23. The yoke 21 carries the ears 24 which support a pin 25, which in turn rotatably supports a caster roller 26. With the exception of the plural collar construction, all of the aforesaid is old in the art and forms no part of the invention.

The unitary cup construction comprises a raceway forming top wall 27, which is preferably flat and extends transversely of the stem or pivot. The wall 27 is extended inwardly and angularly thereof at an angle of 45 degrees to form an inner frusto-conical wall 28, which wall preferably terminates in a lateral portion 29 seatable in the groove 18 and retained in said groove by the collars 16 and 17. The outer end of the wall 27 is extended downwardly therefrom to form a cylindrical flange or outer wall 30, which outer wall is of greater length than the radius of the balls 31, but less than the diameter thereof. This apron or guard flange 30 not only retains the balls within the raceway but also acts as a guard to prevent the admission of dirt and the like to the track plate 22.

The balls 31, as shown in Fig. 1, are adapted to simultaneously engage the top wall 27 of the cup and bottom wall or trackplate 22 and the inner inclined wall 28, pressure being transmitted to and through the balls, at the three points indicated by "A, B and C" in Fig. 1. In Fig. 3 the balls have moved in the raceway and are contacting with the upper wall 27 of the cup, the track plate 22 and the outer wall 30 again providing a three-point support, but in this instance said three-point support is indicated at "A, B and D". The above freedom of movement is secured by having the channel or raceway of a greater width than the diameter of the balls.

In Fig. 2 there is illustrated a modified form of the invention and the same parts illustrated therein are indicated by the numerals increased by 100. The securing plate 112 is secured to the leg 110 by other means, such as screw bolts 109, and herein said track plate 112 is modified to include a retaining portion 113, which also is seatable with the inclined inner wall 128 in the groove 118 of the pintle or pivot.

In Fig. 4 there is illustrated a modified form of the invention shown in Fig. 2. Herein the caster securing plate is integral with the cup. In Fig. 4 the securing plate portion is indicated by the numeral 212, secured to the leg 210 by the bolts or screws 209. The apron, upper track and inner wall portions are indicated by the numerals 230, 227 and 228. The pivot having the enlargements 216 and 217 forms a groove 218 by which the integral cup plate supports the pivot. The pivot swivably supports the lower trackplate 222 by means of the washer 220.

The invention claimed is:

1. A caster including a pivot with a reduced portion, a centrally apertured cup having an inwardly and angularly extending annular portion surrounding the aperture and an outer annular depending portion, said cup being seatable in said reduced portion, a trackplate apertured and receivable by said pivot and pivotally supported thereby, and a plurality of balls in the raceway formed by said cup and said plate, each ball engaging the raceway at three points.

2. A caster including a pivot with a reduced portion, a centrally apertured cup having an inwardly and angularly extending annular portion surrounding the aperture and an outer annular depending portion, said cup being seatable in said reduced portion, a trackplate apertured and receivable by said pivot and pivotally supported thereby, and a plurality of balls in the raceway formed by said cup and said plate, said balls being of less diameter than the width of the raceway, whereby each ball will contact the cup and the yoke and but one of the annular cup portions.

3. A caster including a pivot with a reduced portion, a centrally apertured cup having an inwardly and angularly extending annular portion surrounding the aperture and an outer annular depending apron portion, said cup being seatable in said reduced portion, a trackplate apertured and receivable by said pivot and pivotally supported thereby, a plurality of balls in the raceway formed by said cup and said plate, said apron portion being greater in depth than the radius of said balls and less in depth than the diameter of said balls for retaining the same in the raceway and guarding the same.

4. A caster including a pivot with a reduced portion, a centrally apertured cup having an inwardly and angularly extending annular portion surrounding the aperture and an outer annular depending portion, said cup being seatable in said reduced portion, a trackplate apertured and receivable by said pivot and pivotally supported thereby, a plurality of balls in the raceway formed by said cup and said plate, and a washer retainer on said pivot for securing the trackway to the pivot and engageable by said trackway when the caster is in non-weight supporting position.

5. A caster including a pivot with a reduced portion, a centrally apertured cup having an inwardly and angularly extending annular portion surrounding the aperture and an outer annular depending apron portion, said cup being seatable in said reduced portion, a trackplate apertured and receivable by said pivot and pivotally supported thereby, and a plurality of balls in the raceway formed by said cup and said plate, said balls being of less diameter than the width of the raceway, whereby each ball will contact the cup and the yoke and but one of the annular cup portions, said apron portion being greater in depth than the radius of said balls and less in depth than the diameter of said balls for retaining the same in the raceway and guarding the same.

6. A caster including a leg supporting plate adapted to be secured to a furniture leg, a pivot supported by said plate, said pivot having a reduced portion, a centrally apertured cup having a track-forming portion bearable upon said supporting plate and having an inwardly and angularly extending annular portion surrounding the aperture, and an outer depending portion, said cup being seatable in said reduced portion, a lower trackplate apertured and swivably supported by said pivot, and a plurality of balls in the raceway formed by the cup and the lower trackplate, each ball engaging the raceway at three points.

In witness whereof, I have hereunto affixed my signature.

WILLIAM H. NOELTING.